United States Patent [19]

Kennedy

[11] 4,296,707
[45] Oct. 27, 1981

[54] RAILROAD CAR HAND BRAKE SIGNAL DEVICE

[75] Inventor: Leroy P. Kennedy, Mahwah, N.J.

[73] Assignee: Abex Corporation, New York, N.Y.

[21] Appl. No.: 120,964

[22] Filed: Feb. 13, 1980

[51] Int. Cl.³ .................... B61D 49/00; G01L 19/12
[52] U.S. Cl. ............................. 116/58 A; 188/11.11
[58] Field of Search .................... 116/58 R, 58 A; 188/1 A; 105/1 A

[56] References Cited

U.S. PATENT DOCUMENTS

| | | | |
|---|---|---|---|
| 2,855,247 | 10/1958 | Thompson | 116/70 X |
| 3,314,047 | 4/1967 | Zincke et al. | 188/1 A X |
| 3,611,981 | 10/1971 | Warncke | 116/70 |
| 3,785,333 | 1/1974 | Warncke et al. | 116/70 |
| 3,854,417 | 12/1974 | MacDonnell et al. | 188/1 A X |

Primary Examiner—Daniel M. Yasich
Attorney, Agent, or Firm—Thomas S. Baker, Jr.; David A. Greenlee

[57] ABSTRACT

A railroad car hand brake signal device alerts a train crew when a rail car hand brake is set and air is supplied to the brake pipe during operation of the train. If a rail car hand brake remains applied when air is supplied to the train's brake pipe, a whistle is sounded to enable the crew to identify the car having a set hand brake and a leakage path is provided to cause the air pressure in the brake pipe to fall to alert the train crew in the locomotive that a hand brake is set.

2 Claims, 2 Drawing Figures

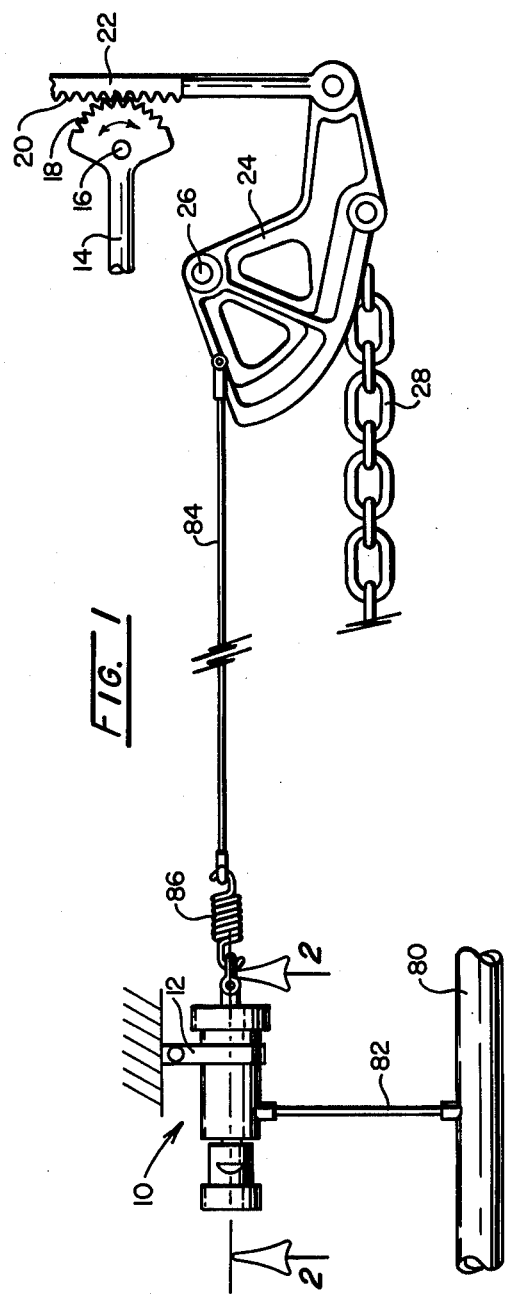
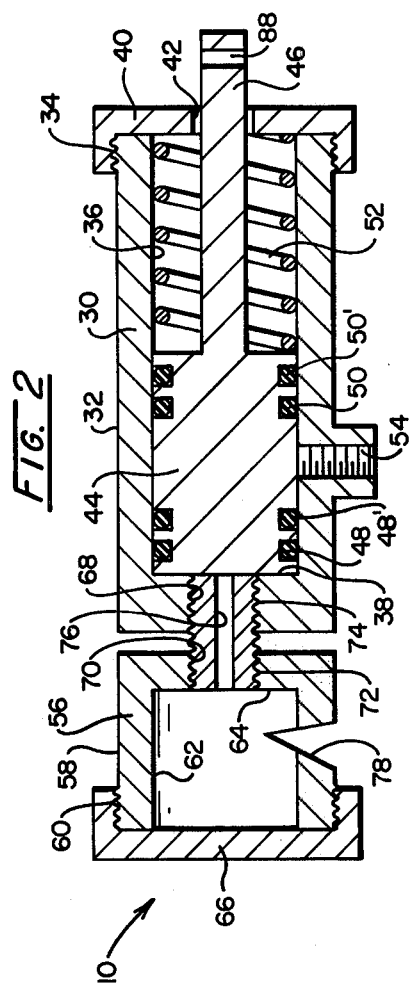

RAILROAD CAR HAND BRAKE SIGNAL DEVICE

BACKGROUND OF THE INVENTION

1. Field of the Invention

The instant invention relates to a device which simultaneously signals a locomotive crew and car inspectors when a railroad car hand brake remains applied and air is supplied to the air brake system.

2. Description of the Prior Art

Hand brakes are manually operated mechanical brakes which are primarily used to hold a railroad car at rest when the car is detached from a train. A typical mechanical hand brake arrangement includes a gear sector which multiplies a manually applied input force from a hand operated brake wheel or lever. The output of the gear sector exerts a tension force on a rod which is attached to a bell crank. The force pivots the bell crank. A brake chain is attached to the bell crank and to the brake lever system of the car. When the bell crank pivots, the brake chain is tensioned and the brake lever system moves the car brake shoes against their respective car wheels. It applies a force similar to that obtained when the car air brakes are applied.

On some railroad cars, a single hand brake applies the brakes on both of the car trucks. On other cars, a hand brake applies the brakes to the wheels of only one truck. In the event that a hand brake is inadvertently left applied when a train leaves a terminal, and the car is empty, the brake shoe force may be sufficient to lock the wheels and cause them to slide as the car moves. This may produce a flat spot and a double flange contour on the wheel that can cause a derailment when the wheel encounters a switch. If the car is not empty and the wheels rotate with the brake applied, heat will cause the wheels to become damaged to the extent that they must be changed and the brake shoes will be destroyed if the hand brake remains applied for an extended period of time.

It is most difficult for a car inspector to determine that a railroad car hand brake is applied on a car equipped with a hand brake which operates on a single truck and/or on a car which uses composition brake shoes. This is because hand brakes operable on only one truck are more easily overlooked by car inspectors during inspection. Also, there is less friction between composition brake shoes and car wheels than between cast metal brake shoes and car wheels at very low speeds. Consequently, the composition brake shoe will not lock a wheel as readily as a cast metal brake shoe when a train is starting into motion and moving slowly past inspectors. Of course, a locked wheel indicates a hand brake is applied. Furthermore, a composition brake shoe produces little or no audible sound when applied to a revolving wheel tread, whereas a cast metal brake shoe produces a definite audible sound when applied to a revolving wheel tread, which indicates a brake is applied.

A common type of device which indicates a railroad car hand brake is applied is shown in U.S. Pat. No. 3,854,417. In this device, a mechanically operated flag provides a visual indication when a car hand brake is applied. In order for the device to be effective as a warning, train crew members, inspectors or others must be within a reasonable distance of the car to observe the displayed flags. An average train may consist of 150 cars with lengths exceeding 50 feet. Since cars in the middle of the train may be over a half-mile away from either the locomotive or the caboose, the train crew members could not observe the flags while on the train. At night, or in adverse weather, it is possible that car inspectors standing beside the car would also not observe the flags.

It is desirable to provide a warning device which simultaneously alerts a train crew in a train locomotive and inspectors alongside the train that a railroad car hand brake has inadvertently been left applied. Furthermore, it is desirable to provide an indicating device which operates when a train is stationary so that an applied hand brake can be released before a train departs from a terminal and before brake shoe or wheel damage occurs.

Federal regulations require that brake pipe leakage tests be conducted before a train departs from where it is originally made up and at designated distances along the route to its destination. The brake pipe is the length of pipe and hose extending throughout the length of the train by means of which compressed air is supplied to the brake devices on the railroad cars and the pressure so controlled as to effect the application and release of the brakes. The regulations state the brake pipe leakage must not exceed five pounds per minute. The brake pipe leakage test is performed by the crew of the locomotive which observes an air pressure gauge to determine if there is brake pipe leakage which exceeds five pounds per minute. The instant invention provides a signal device which is connected to the hand brake mechanism on a railroad car and which causes a brake pipe line to be opened such that brake pipe leakage exceeds five pounds per minute when the car hand brake is applied and air pressure is supplied to the brake pipe. In this way, the crew of the locomotive is made aware that a hand brake remains applied on a car in the train. Further, the instant signal device provides an audible whistle when the hand brake is applied and air pressure is supplied to the brake pipe. This enables car inspectors to quickly locate a car which has a set hand brake.

SUMMARY OF THE INVENTION

The instant invention provides a railroad car hand brake signal device which simultaneously opens the brake pipe line to cause leakage in excess of a desired amount and emits an audible warning when air pressure is supplied to the brake pipe of a car which has a set hand brake.

DESCRIPTION OF THE DRAWINGS

FIG. 1 is a schematic view of the railroad car hand brake signal device of the instant invention attached to the manual hand brake linkage on a railroad car; and FIG. 2 is an axial sectional view of the railroad car hand brake signal device along lines 2—2 of FIG. 1.

DESCRIPTION OF THE PREFERRED EMBODIMENT

Referring to FIG. 1, the railroad car hand brake signal device 10 of the instant invention is mounted on a hanger 12 which is rigidly affixed to a railroad car body, not shown, at any convenient location. The signal device 10 is actuated when the railroad car hand brake is set. A schematic diagram of the hand brake system is shown in FIG. 1. The hand brake system includes a handle 14 which is pivotally mounted at a convenient location 16 on a railroad car, not shown. Handle 14 is rigidly attached to a gear sector 18 which engages a mating toothed portion 20 of a pull rod 22. Pivotal movement of handle 14 and gear sector 18 causes vertical movement of the pull rod 22.

Pull rod 22 is pivotally connected to a bell crank 24 which is pivotally mounted at 26 on a railroad car frame, not shown. A brake chain 28 has one end attached to the railroad car brake rigging, not shown, and the other end attached to bell crank 24. When pull rod 22 is moved upwardly, bell crank 24 pivots counterclockwise about pivot 26, the brake chain 28 is placed in tension and the brake rigging operates to set the brake shoes against their respective wheel treads to thereby secure the railroad car at rest.

The hand brake signal device 10 of the instant invention which indicates the hand brake is set when air is supplied to the brake pipe will now be described. The device 10 includes a main housing 30 which has an outer surface 32 threaded at one end 34. A bore 36 is formed in housing 30 which terminates at an end wall 38. A cover 40 has an axial bore 42 and is threaded on housing end 34. A piston 44 which has a rod 46 is mounted for reciprocation in bore 36. The rod 46 projects through cover bore 42. Piston 44 has a first pair of O-rings 48, 48' and a second pair of O-rings 50, 50' to prevent leakage along the outer surface of piston 44. A spring 52 is mounted in housing bore 36 and acts between the inside of cover 40 and the rod end of piston 44 to bias the piston 44 against end wall 38. A threaded port 54 projects laterally through a wall of main housing 30 and breaks into housing bore 36 at a space between the first pair of O-rings 48, 48' and the second pair of O-rings 50, 50' when the piston 44 is seated against end wall 38.

The hand brake signal device 10 has a whistle housing 56 which has an outer surface 58 threaded at one end 60. An inner bore 62 is formed in whistle housing 56, which bore terminates at an end wall 64. A cover 66 is threaded onto the end 60 of housing 56 to close the end 60 of bore 62. End wall 38 of main housing 30 has a threaded bore 68 and end wall 64 of whistle housing 56 has a threaded bore 70. A connector 72, which has a threaded outer surface 74, has one end threaded into bore 68 and the other end threaded into bore 70 to thereby rigidly connect main housing 30 and whistle housing 56. Connector 72 has a longitudinal bore 76 which connects bore 36 of housing 30 with inner bore 62 of whistle housing 56. Whistle housing 56 also has a conventional air operated whistle 78 formed therein.

The hand brake signal device 10 of the instant invention is connected to the brake pipe line 80 of a railraod car by a fluid conduit 82 which has one end threaded into port 54. The signal device 10 is connected to the bell crank 24 in the hand brake linkage as follows. One end of a cable 84 is attached to bell crank 24 and the other end is attached to one end of a coil spring 86. The opposite end of spring 86 is mounted in a lateral bore 88 formed on the end of rod 46 which projects from housing 30. Spring 86 limits the tension that can be exerted on rod 46.

Operation of the railroad car hand brake signal device 10 of the instant invention is as follows. When handle 14 is pivoted counterclockwise, pull rod 22 is moved upward and bell crank 24 is pivoted counterclockwise to tension brake chain 28 and thereby set the car brakes as described above. When bell crank 24 pivots counterclockwise, cable 84 is placed in tension. The tension force of cable 84 is transmitted through spring 86, which is relatively stiff, to the piston and rod assembly 44, 46 to move the assembly to the right of bore 36 against the force of spring 52. When the piston and rod assembly 44, 46 is in this position, port 54, which is connected to the brake pipe line 82, is open to housing bore 36 and to whistle housing bore 62 through the longitudinal bore 76 in connector 72. The bore 76 is sized to cause a brake pipe leakage rate in excess of the maximum leakage rate permitted by Federal regulations, which is five pounds per minute. The air passing through bore 76 exits from whistle housing 56 through whistle 78 and produces an audible sound.

Consequently, when air is supplied to the brake pipe line and the railroad car hand brake is applied, the hand brake signal device 10 of the instant invention operates to cause an excessive amount of brake pipe leakage to thereby alert the train crew that a hand brake remains set and also causes an audible whistle to thereby alert inspectors that the car which has the subject signal device has its brakes applied.

Obviously, those skilled in the art may make various changes in the details and arrangements of parts without departing from the spirit and scope of the invention as it is defined by the claims hereto appended. Applicant, therefore, wishes not to be restricted to the precise construction herein disclosed.

I claim:

1. A railroad car hand brake signal device for alerting a train crew that a hand brake is applied when air is supplied to a train brake pipe during operation of the train, the signal device comprising a housing and means for mounting the housing on a railroad car; characterized by a port formed laterally in a wall in the housing which is connected to the railroad car brake pipe, blocking means for blocking the port movable within the housing between a first position which blocks the port and a second position which opens the port to bleed air in the brake pipe into the housing, an air operated whistle formed in the housing, a passage formed in means connecting the whistle to the housing which connects the port with the whistle, the passage being sized to cause significant bleed off of air in the brake pipe when the port is open to signal the train crew, and means for connecting the blocking means with a movable element of the hand brake wherein when the hand brake is applied the element moves in one direction to thereby move the blocking means to the second position to uncover the port to cause air to bleed from the brake pipe and the whistle to operate.

2. The hand brake signal device of claim 1, further characterized by means for biasing the blocking means toward the first position.

* * * * *